Dec. 22, 1970  G. RAWSON  3,549,203
RETRACTABLE SAFETY BELT RESTRAINT SYSTEM
Filed May 1, 1969  3 Sheets-Sheet 1
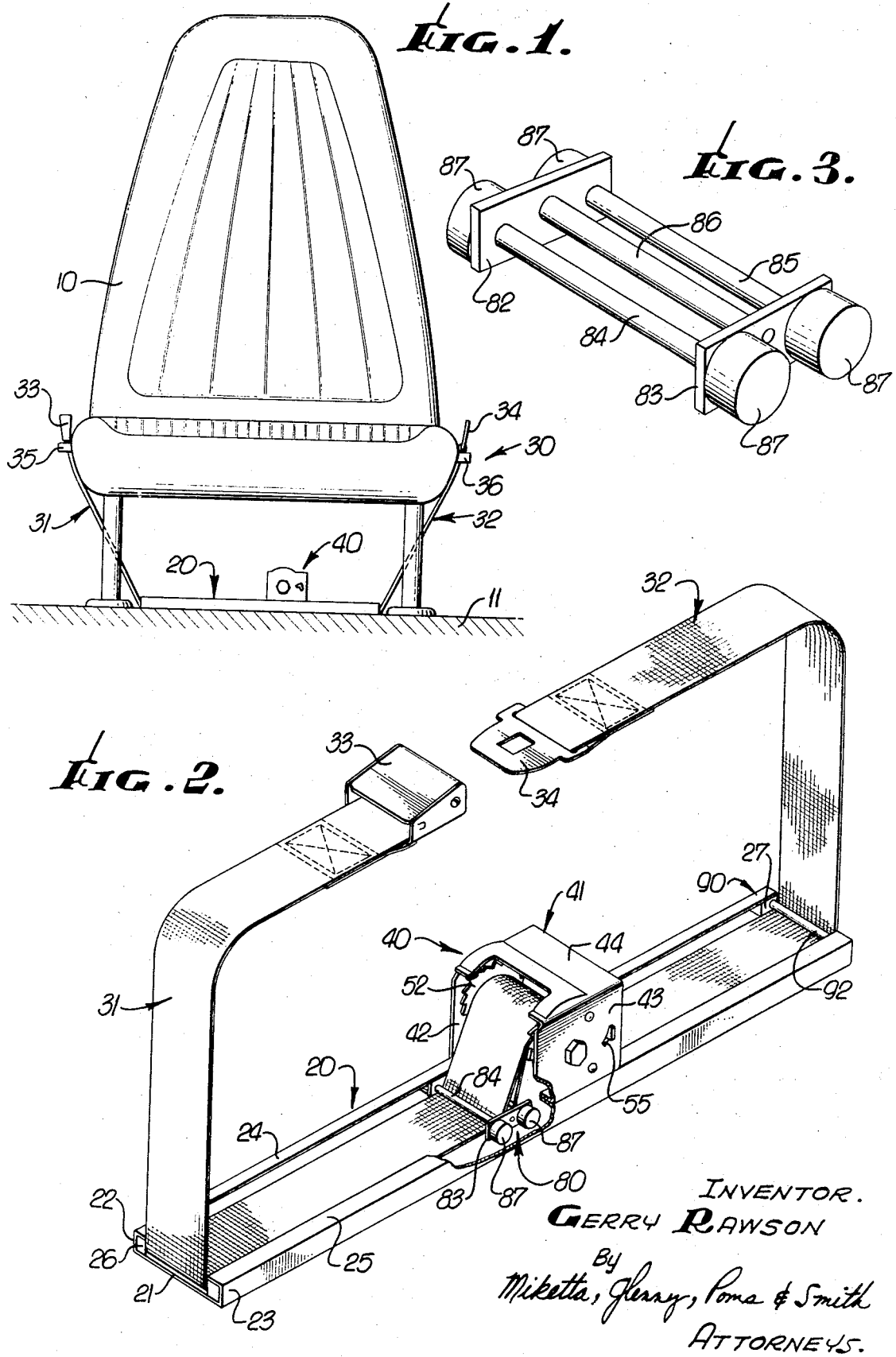
INVENTOR.
GERRY RAWSON
By
Miketta, Glenny, Poms & Smith
ATTORNEYS.

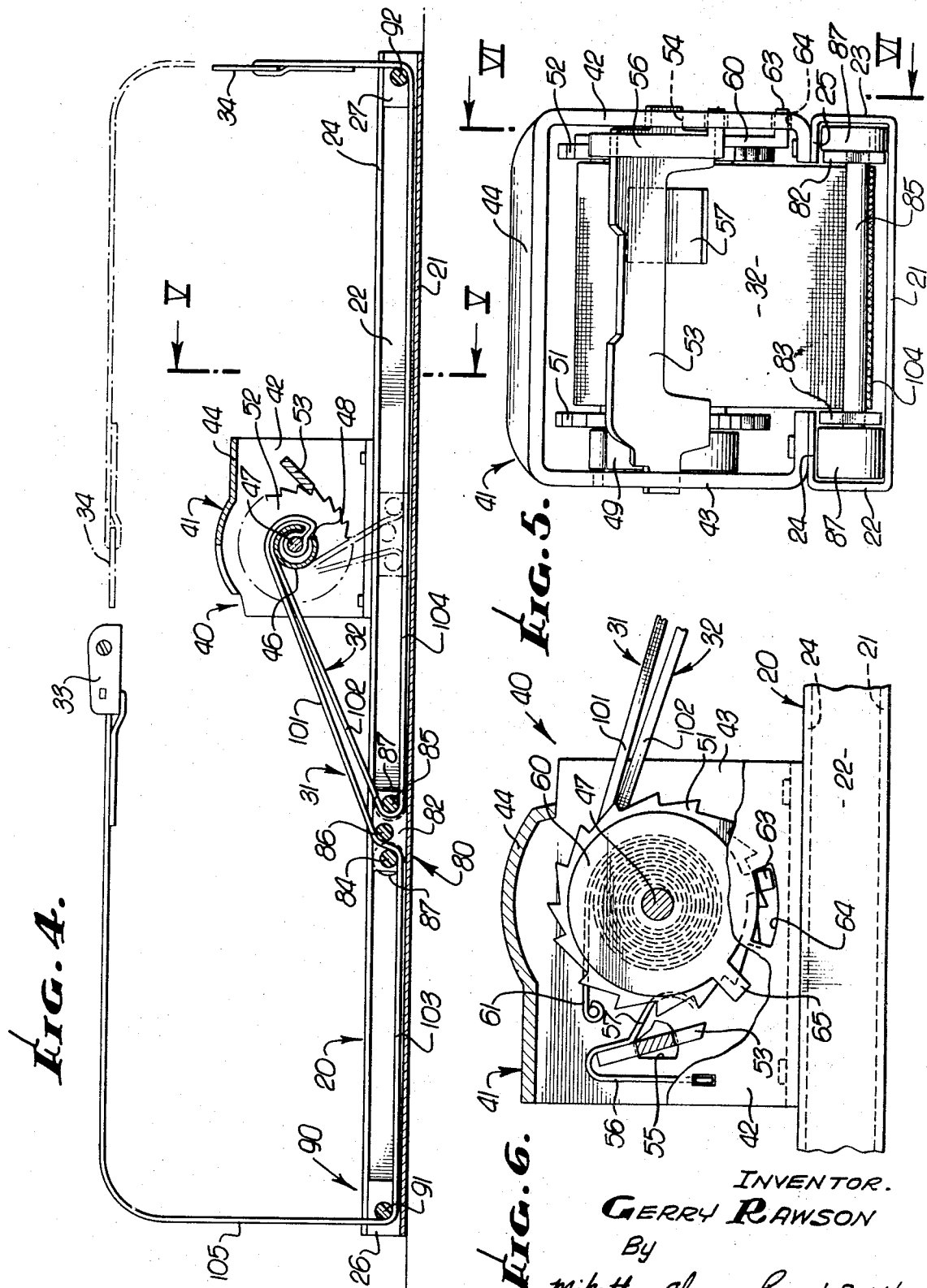

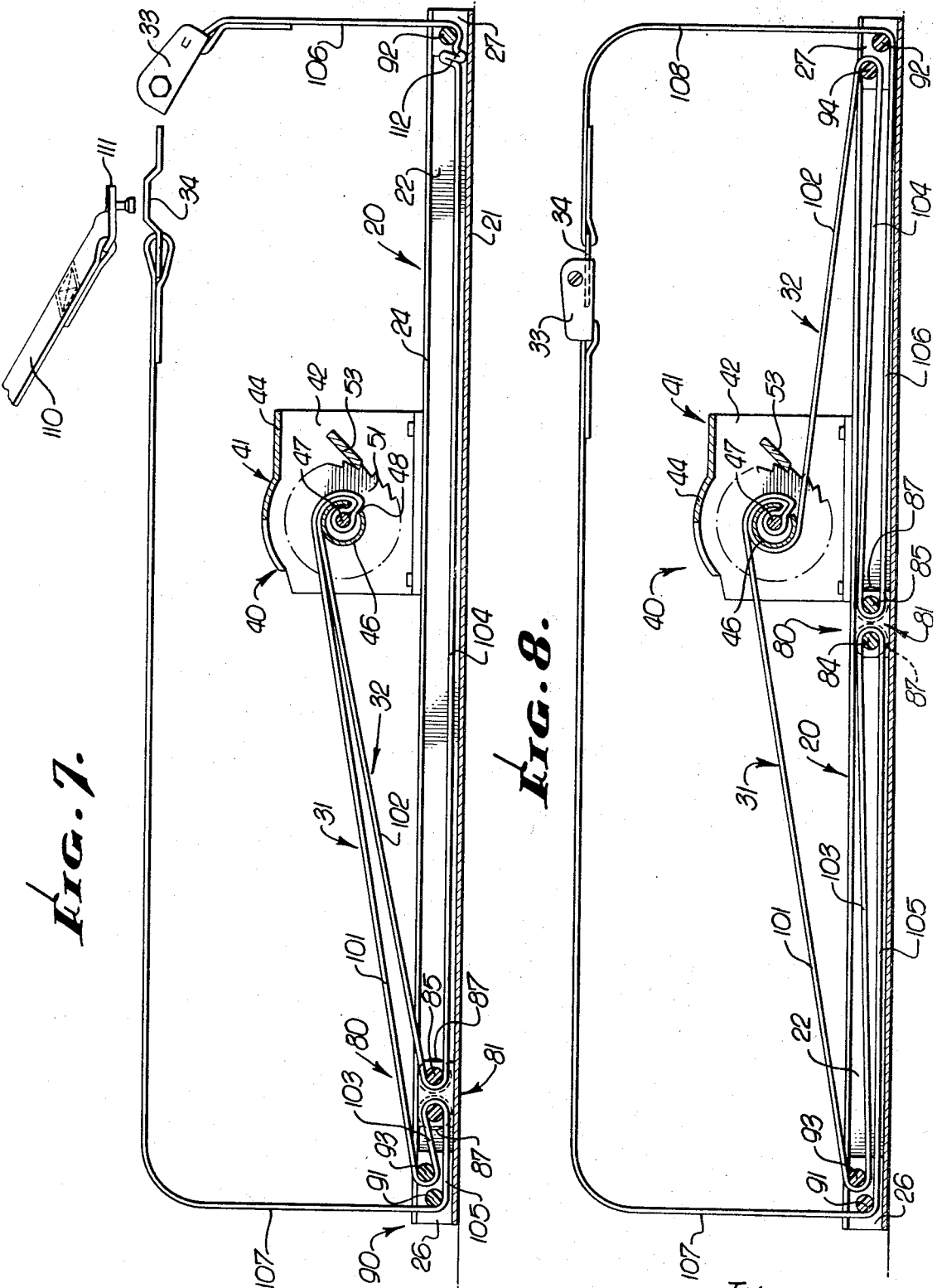

United States Patent Office 3,549,203
Patented Dec. 22, 1970

3,549,203
RETRACTABLE SAFETY BELT RESTRAINT SYSTEM
Gerry Rawson, Valencia, Calif., assignor to American Safety Equipment Corporation, New York, N.Y., a corporation of New York
Filed May 1, 1969, Ser. No. 820,900
Int. Cl. A47c 31/00; B65h 75/48
U.S. Cl. 297—388                9 Claims

ABSTRACT OF THE DISCLOSURE

A retractable safety belt restraint system for securing a vehicle occupant in a seat including a single retractor device to which is secured the ends of two safety belt members biased for retraction to an out-of-the-way position, the members having means for latching them in operative engagement about the occupant and including slack preventing means permitting the belt members to be non-simultaneously protracted to their operative position to effect the latching engagement. Alternative embodiments are disclosed which position the latching means of the safety belt members at a desired location with respect to the occupant when the safety belt members are in operative engagement.

BACKGROUND OF THE INVENTION

The use of passenger restraint systems in vehicles, such as automobiles and airplanes, has now become commonplace. While lower torso restraint systems, commonly known as lap belts, have been in widespread use for many years, current safety requirements, including Federal standards, have now dictated the use of upper torso restraint systems in automobiles, such as the well known three-point restraint apparatus. The proliferation of the number of seat belt members, particularly in automobiles, has given rise to the need for ancillary equipment to faciltate the use of the seat belt members by the public. The industry solution to the problems of the multiplicity of seat belt members has been the adoption of retracting devices wherein the ends of the seat belt member are secured to a retractor so that when the belt member is not in use, it may be retracted to an out-of-the-way position. In this manner, the undesirable appearance and nuisance of loose seat belts lying over the seat surface while not in use has been accomplished. Such retraction devices also prevent the latching members on the free end of the seat belts from being inadvertently crushed or damaged by the closing of an automobile door which may occur when the belts are loose. These devices also prevent entanglement of the loose ends of a multiplicity of seat belt members, thereby making the latching elements easier to locate thus facilitating the use of the restraint system.

However, generally a single retractor for retracting a single belt member is currently employed primarily because of the expense in manufacture, maintenance, etc., attendant to the use of a retracting device for each seat belt member. Where a large number of seat belt members are employed in an automobile, for example, the use of a retracting device for each seat belt member may be prohibitive in cost. On the other hand, the desirable use of a single retractor device for the secured ends of two seat belt members comprising the restraint elements for a single occupant has given rise to problems not satisfactorily solved by the industry. One such problem is the necessity for simultaneous and equal rate protraction of both seat belt members in order to avoid the slack, gathering and fouling up of the flexible webbing portion of the lagging seat belt member adjacent the retractor which may prevent operation of the retractor device. Furthermore, such system may be disadvantageous in certain installations since it precludes positioning of the latch members when in operative engagement about the passenger in other than the center of the passenger precluding proper organization for a three-point system. Such fixed center operation may also be uncomfortable to the occupant.

SUMMARY OF THE INVENTION

Generally stated, the present invention provides a retractable safety belt restraint system for securing a vehicle occupant in a seat comprising a pair of safety belt members having means for latching the members in operative engagement carried by the free ends of such members, a frame including a track, retracting means mounting the other ends of the safety belt members for protraction and retraction including spring means constantly biasing the belt members to a retracted position, means for preventing slack in one of the safety belt members when the other of the safety belt members is protracted and spaced apart guide means on opposite sides of the retracting means engaging the belt members, the belt members having intermediate portions in bearing engagement with the slack preventing means and with the spaced apart guide means so that the belt members may be individually protracted to effect latching operative engagement.

From the above general description of the present invention, it will be appreciated that a primary advantage of the present invention is the provision of a single retractor for the secured ends of both safety belt members so that the belt members may be protracted non-simultaneously without affecting operability of the retraction device. Moreover, since both seat belt members are secured to a single retracting device, the seat belt members may comprise a single integral belt, which may be constructed of one piece of webbing, without any anchor devices, unnecessary stitching, or the like. Other advantages of the present invention reside in the versatility of several embodiments wherein the latching elements during operative engagement may be positioned at a particular location relative to the body of the occupant or may be movable to any desired location by only slight modification of the system components.

Other objects and many of the attendant advantages of this invention will be more readily appreciated as the same become better understood by reference to the following detailed description when considered in connection with the accompanying drawings.

BRIEF DESCRIPTION OF THE DRAWINGS

FIG. 1 is a front elevation view of a vehicle seat and an exemplary embodiment of a retractable safety belt restraint system constructed in accordance with the present invention;

FIG. 2 is a perspective view of a first embodiment of the retractable safety belt restraint system of FIG. 1;

FIG. 3 is a perspective view of means for preventing slack of the safety belt members;

FIG. 4 is a diagrammatic elevational view of the embodiment shown in FIG. 2, illustrating one of the safety belt members in alternate positions;

FIG. 5 is a side sectional view taken along the plane V—V of FIG. 4;

FIG. 6 is a sectional view taken along the plane VI—VI of FIG. 5;

FIG. 7 is a diagrammatic front elevation view of a second embodiment of a retractable safety belt restraint system constructed in accordance with the present invention; and FIG. 8 is a diagrammatic front elevation view of a third embodiment of a retractable safety belt restraint

DESCRIPTION OF THE PREFERRED EMBODIMENTS

The restraint system of the present invention may be installed in a vehicle, such as an automobile, generally below a seat 10 and mounted on a floor 11. It will, of course, be understood that the restraint system may be generally behind the vehicle seat and may be anchored on the seat itself or other portion of the vehicle. Moreover, the restraint system may be mounted in a position inverted from that shown and may employ guide members or the like so as to properly position the seat belt members when in operative engagement. It will also be understood that the restraint system of the present invention may also comprise in addition to the lap belt members illustrated, shoulder strap or belt members so as to provide upper torso restraint.

Generally, the restraint system of the present invention comprises a frame, indicated generally at 20; safety belt members, indicated generally at 30; retracting means, indicated generally at 40; means for preventing slack, indicated generally at 80; and guide means, indicated generally at 90. Three embodiments of the present invention will be shown and described, each of which generally comprise the same elements and which differ primarily in the relationship between the safety belt members and the slack preventing and guide means which are modified for the several embodiments. Accordingly, a general description of the system will be given first with a more detailed description of each of the several embodiments following.

In the exemplary embodiment, the restraint system comprises a frame 20 which may include a base wall 21, sidewalls 22, 23 each having an inturned flange wall 24, 25, respectively. The inturned flange walls, sidewalls and a portion of the base wall define a longitudinally extending track. The frame is generally oriented transverse to the direction in which the seat and occupant are facing. At each end of frame 20 there are provided stop means for limiting the movement of the slack preventing means, such stop means comprising blocks 26, 27 positioned at each end of the frame below the inturned flanges and adjacent the sidewalls 22, 23. It will be appreciated that frame 20 is only exemplary and may be integral with the vehicle floor or seat.

The safety belt means 30 in the exemplary embodiment comprises first and second seat belt members 31, 32, respectively. The safety belt means carries latching means which in the exemplary embodiment comprises a buckle 33 mounted on the free end of first safety belt member 31 and a complementary tongue plate 34 mounted on the free end of the second seat belt member 32. Since such latching means are well known in the art, no further description is required. The ends of the safety belt members may be positioned for easy grasping by the occupant through holder members 35, 36 mounted on opposite sides of seat 10. It will also be understood that the safety belt members 31, 32 may comprise a continuous belt of webbing material or two separate belts of webbing material.

The retracting means 40 of the exemplary embodiment may comprise a retractor of the general type described and claimed in U.S. Pat. No. 3,174,704, issued Mar. 23, 1965. Briefly, such retractor comprises a frame, a reel, safety belt means wound around the reel in a predetermined wound condition from which it is adapted to be unwound during protraction, means constantly biasing the reel so as to retract the safety belt means, stop means for preventing protraction rotation of the reel, and deactivator means for rendering the stop means selectively inoperative. Such retractor permits the safety belt means to be protracted from the reel to an operative position and prevents further protraction upon partial rewind of the reel.

The retracting means of the exemplary embodiment of the present invention is more specifically of the type employing deactivating means comprising a disc as described and claimed in U.S. Pat. No. 3,412,952, issued Nov. 26, 1968. While the retractor device of the last-mentioned patent differs in structure from the previously mentioned patent the same result is obtained, namely, further protraction of the safety belt means is prevented after initial protraction, by partial rewind of the reel. In the exemplary embodiment of the present invention, the retraction means of the second-identified patent, in slightly modified form, is illustrated and generally comprises a frame or body 41 including sidewalls 42, 43 and top wall 44. The body 41 is mounted on the inturned flange walls 24, 25 of frame 20. Referring particularly to FIGS. 2, 4, 5 and 6, the retracting means 40 also includes an arbor spool or reel 46 concentrically mounted about an axle 47. The spool 46 has an axial slot 48 through which the safety belt member 31 passes circumscribing axle 47 and passing out of the slot so as to define the second seat belt member 32. The retracting means 40 also includes means constantly biasing the reel for retraction of the belt members 31, 32 which in the exemplary embodiment includes the helical spring 49 secured at one end to sidewall 42 of housing 41 and at the other end to the reel. The reel is fixedly mounted to a pair of ratchet wheels 51, 52. A pawl member 53 is pivotally mounted in sidewalls 42, 43 of housing 41 through arcuate slots 54, 55. A flat spring 56 constantly urges pawl 53 into engagement with the ratchet wheels so as to define stop means for preventing protraction rotation of the reel.

The deactivator means of the exemplary retractor device of the present invention may include a sensor element 57 responsive to the safety belt members wound around the reel so as to render the stop means inactive. The sensor element 57, through the bias of flat spring 56 urging the pawl 53 in a clockwise direction as seen in FIG. 6 rides on the safety belt members wound on the reel so that when a predetermined amount of material is wound on the reel engaging the sensor element 57 the pawl 53 is rotated clockwise. It will therefore be appreciated that when the safety belt members are fully retracted, the stop means pawl 53 is rendered inactive and partial rewind after slight protraction of several revolutions of the reel will not render the stop means active. After additional revolutions of the reel, through further protraction of the seat belt members, the sensor element 57 will become disengaged from the safety belt member material so that further deactivator means, to be described, may render the stop means active or inactive.

The deactivator means also comprises a deactivator disc 60 mounted on reel 46 adjacent one of the ratchet wheels 52 and axially urged by spring 61 into frictional contact with such wheel so as to rotate therewith. At the perimeter of the disc 60, there is provided an axially outwardly extending tab 63 which extends into an arcuate slot 64 in housing sidewall 43 and limits angular movement of the disc. Disc 60 is also provided with a radially outwardly extending element 65 for engaging pawl member 53.

In operation, the seat belt members 31, 32 may be protracted by rotating reel 46. During the initial protraction, sensor element 57 is in contact with the belt material and maintains stop means pawl 53 in the inactive position so that the reel is free to rotate. During this initial protraction, even if the occupant momentarily stops protraction of the belts and allows a partial rewind, the stop means cannot be rendered active because of the sensor element 57. When a predetermined amount of the seat belts have been unwound, sensor element 57 no longer engages the seat belt members. However, as seen best in FIG. 6, when the seat belt members are protracted, the reel rotates counter-clockwise as does the deactivator disc 60 which is in frictional engagement therewith. The tab 63 projects into arcuate slot 64 and is limited for movement to a position wherein the element 65 abuts the lower end of pawl 53 preventing the pawl from engagement with the ratchet wheel so as to prevent further protraction of the reel. It will be seen that a partial rewind, however, will allow the tab 63 on disc 60 to rotate clockwise so as to move the element 65 to a second position, out of the way of the path of pawl 53, so that the pawl is urged by spring 56 into engagement with the teeth on ratchet wheels 51, 52 thereby preventing further protraction of the seat belt members.

The above specifically described retracting means should be understood to be only exemplary, since other types of retractors may be employed, for example, those disclosed in Patent Nos. 3,389,874, 3,384,415, 3,375,994, 3,348,789, 3,338,532, 2,861,827, and 2,814,504. It will therefore be seen that the particular type of retracting means is not critical to the present invention.

The restraint system of the present invention also includes slack preventing means 80 which in the exemplary embodiment comprises a dolly 81 having a pair of side members 82, 83 (see FIG. 3) and at least two transversely mounted parallel spaced apart pins 84, 85. An intermediate pin 86 is provided in the first exemplary embodiment shown in FIGS. 2, 3, and 4. Each of the outer pins are provided with rollers or wheels 87 mounted exteriorly of side members 82, 83 and adapted to be received in the track between the inturned flange walls 24, 25 and base wall 21 of frame 20. Dolly 81 is therefore mounted for longitudinal slidable movement relative to frame 20 and limited at the ends of the frame by limit block 26, 27. The dolly 81 and frame track are only exemplary of means for preventing slack when one of the seat belt members is protracted at a greater rate or to the exclusion of the other seat belt member.

The restraint system also includes guide means 90 which in the exemplary embodiment comprises at least one guide rod or member 91, 92 at each end of frame 20 in spaced apart relation from retracting means 40. The guide means for the seat belt members may take other forms and may be mounted on the floor, seat or frame providing they are located in spaced opposite positions from the retracting means 40. Since the guide means and slack preventing means of the present invention differ from the three embodiments, further description will now be made in connection with each of such separate embodiments.

The first embodiment is illustrated in FIGS. 2 through 4 wherein the dolly 81 comprises the three parallel transversely mounted pins 84, 85 and 86 and the guide means comprises a single rod or pin 91, 92 at each end of frame 20. The seat belt members 31, 32 each include a first longitudinal segment 101, 102, respectively, extending from the reel 46 of the retracting means 40 toward the dolly 81. Each of the belts pass on opposite sides of the intermediate dolly pin 86, and between the outer dolly pins 84, 85. The belt members then extend in opposite directions defining second segments 103, 104 between said dolly pins 84, 85 and the guide rods 91, 92. Third segments 105, 106 are defined by the portion of the seat belt members 31, 32, respectively, extending away from the guide rods 91, 92 and around the occupant and seat when the safety belt members are latched in operative engagement.

In operation, assume that the seat belt members 31, 32 are fully retracted an an occupant commences to use the restraint system. In this initial position, dolly 81 is located directly below the retracting means 40, as shown in phantom lines in FIG. 4. If the occupant grasps one of the latching elements, such as buckle 33, and commences protraction of seat belt member 31, the dolly 81 will be drawn to the left, as viewed in FIG. 4, which simultaneously takes up the slack in the non-protracted seat belt member 32 by forming the longitudinal segment 102 and a portion of the second segment 104 which extend away from the guide rod 92. Upon protraction of a sufficient amount of seat belt, the second seat belt member may be grasped and protracted. This results in a reversal of movement of dolly 81, to the right as viewed in FIG. 4, so that the first segment 101 of seat belt member 31 is shortened, while the second segment 103 is lengthened, and simultaneously shortening the first segment 102 of seat belt member 32 while also shortening the second segment 104 of member 32. It should now be apparent that upon latching engagements of the buckle 33 and tongue plate 34, the dolly will be repositioned below the retracting means 40. Moreover, should the third segment 105 of seat belt member 31 be initially too long, i.e., the first seat belt member 31 is protracted more than half way around the occupant and seat, the third segment 106 of seat belt member 32 may be shorter and thus the buckle and tongue plate may be positioned off-center with respect to the occupant and seat. However, it will be appreciated that the buckle and tongue plate will "center" themselves since the retraction bias of the retracting means will always urge the longer third segment of the seat belt member toward retraction so as to move the dolly in the reversed direction from its initial travel in response to protraction of the first seat belt member. The dolly will be moved toward the retracting means until the retracting bias is equally applied to both of the seat belt members which occurs only when the length of these third segments (as well as the other segments) of the seat belt members are equal in length which effects the centering of the latching elements. Accordingly, the first embodiment of the restraint system of the present invention assures that the latching elements will always be centrally disposed with respect to the occupant and seat.

The second embodiment of the present invention is shown in FIG. 7. It will be seen that dolly 81 comprises only two transverse dolly pins 84, 85 between side members 82, 83, such pins supporting rollers 87. Guide means 90 comprises first guide rods 91, 92, as in the first embodiment, and an additional guide rod 93 at the left end of the retractor 20 (as viewed in FIG. 7) supported in the guide block 26. Guide rods 91, 93 are generally parallel and closely longitudinally spaced apart. The seat belt member 31 includes a first longitudinal segment 101 extending from the retracting means 40 towards the dolly 81, and between the closely spaced guide rods 91, 93. A second segment 103 of seat belt member 31 is defined by the length of belt between guide rod 93 and dolly pin 84. The seat belt member 31 passes around dolly 84 extending toward the end of the frame 20 so as to define a third segment 105 extending between dolly pin 84 and guide rod 91. A fourth segment 107 of seat belt member 31 is defined by the portion of the member extending away from guide rod 91 and around the passenger and seat.

The second seat belt member 32 comprises a first segment 102 extending between the reel 46 of retracting means 40 toward the second dolly pin 85, passing around such dolly pin and extending toward guide rod 92 so as to define a second longitudinal segment 104. A third segment 106 having buckle 33 at the free end thereof is defined by the portion of the seat belt member 32 extending away from guide rod 92 to circumscribe the passenger. The restraint system of the second embodiment of the invention also includes a third belt member 110 comprising a shoulder strap having a latching element 111 on the free end thereof for engaging the tongue plate 34 carried by the free end of fourth segment 107 of seat belt member 31. As indicated previously, in a three-point safety belt system, wherein a single shoulder strap passes over an occupant's shoulder and diagonally across his chest, the lower end of the shoulder strap member must be secured adjacent the hip of the occupant opposite from the shoulder over which the belt passes. Accordingly, it is imperative that the latching elements, particularly the tongue plate 34, be maintained at a particular position with respect to the occupant and seat. To accomplish this result, seat belt member 32 is provided with stop means 112 which may be a double-fold of seat belt webbing properly stitched so as to prevent that portion of the belt from passing between the guide rod 92 and the base wall 21 of the frame 20. Obviously, other types of stop means are useable in the present invention.

In operation, assume again that each of the seat belt members 31, 32 are in the fully retracted position and ready for use by an occupant. In this condition, the dolly 81 is positioned below the retracting means 40. When one of the seat belt members, such as member 31, is protracted, the dolly 81 will slide to the left, as viewed in FIG. 7. Assume that the occupant, not cognizant of the requirement that the latching elements be positioned above the hip, protracts the seat belt member 31 only to the extent that the tongue plate 34 is in the generally center position. The occupant will then attempt to withdraw seat belt member 32 to effect the latching. However, upon protraction of the seat belt member 32, protraction will be prevented prior to centering of the dolly below the retracting means, by stop means 112 which limits the length of third segment 106 of seat belt member 32. Latching can be effected only by further protraction of seat belt member 31 which the occupant will perform. Of course, in the event that the occupant should protract first seat belt member 31 too far, and the latching is effected so that the third longitudinal segment of seat belt member 32 is shorter than prescribed, the dolly 81, through the bias of the retracting means spring, will position itself with respect to the retracting means so that the latching elements are properly positioned for receiving the latch 111 of the shoulder strap 110. It will also be noted that the dolly 81, when the seat belt members are in latched operative engagement, is not positioned below retracting means 40, since the difference in the length of the operative segments 106, 107 of the seat belt members require that slack be taken up by the dolly 81 during use of the restraint system as well as during the protract-retract operation.

The third exemplary embodiment of the present invention is shown in FIG. 8. The dolly 81 in the third embodiment is identical in all respects to the dolly of the second embodiment and comprises only two transverse dolly pins 84, 85. The guide means 90 of the third exemplary embodiment comprise the guide rods 91, 92 as in the first and second embodiments, the guide rod 93 longitudinally closely spaced adjacent the guide rod 91 as in the second exemplary embodiment, and a guide rod 94 longitudinally closely spaced adjacent guide rod 92 and supported in limit block 27. In this embodiment, safety belt member 31 includes a first segment 101 extending between the reel 46 of retracting means 40 and the guide rod 93 at the left end of frame 20. A second longitudinal segment 103 is defined by the portion of the seat belt member extending between the guide rod 93 and dolly pin 84. A third segment 105 is defined by the portion of the member extending between the dolly pin 84 and the other guide rod 91 at the same end of the frame 20. A fourth and final segment 107 is defined by the portion of the seat belt member 31 which circumscribes the occupant and seat after passing around guide rod 91. The fourth segment 107 supports a buckle 33 on the free end thereof.

The second seat belt member 32 also includes a first longitudinal segment 102 extending between the retracting means 40 and the guide rod 94. The belt passes around guide rod 94 toward dolly pin 85 and defines a second segment 104 therebetween. A third segment 106 is defined by the portion of the safety belt member between dolly pin 85 and the other guide rod 92 at the same end of frame 20. The final and fourth segment 108 of the second seat belt member 32 is defined by the portion of the belt passing around guide rod 92 and about the passenger and seat. The fourth segment 108 carries a tongue plate 34 on the free end thereof.

In operation, again assuming that the dolly 81 is positioned below retracting means 40, assume that the occupant first protracts seat belt member 31 by grasping and pulling on buckle 33. This will cause dolly 81 to move to the left end of the frame 20, as viewed in FIG. 8. When the second safety belt member 32 is protracted, the dolly will reverse its movement and be drawn back toward the retracting means 40 until a sufficient length of belt has been protracted so that the latching elements 33, 34 may be engaged. It will be appreciated that in the present embodiment the latching elements 33, 34 may be positioned as desired by the occupant and will not be centered by the retracting bias of the device. This results from the configuration whereby the length of belt protracted from the reel for each of the safety belt members 31, 32 is always equal regardless of the length of the fourth segments 107, 108 which circumscribe the passenger and seat.

It will be understood that while operation has been described as commencing with protraction of seat belt member 31, the same result is obtained for each embodiment by initial protraction of seat belt member 32. Also, it will be noted that with the retracting means 40 of the exemplary embodiments, the belt members will be locked against further protraction, and ready for use in an emergency to restrain the occupant, upon partial rewind of the reel when one belt member is allowed to slightly retract.

From the preceding detailed description of several exemplary embodiments of the present invention, it will be seen that all of the advantages previously claimed are accomplished. Other modifications and variations of the present invention are possible in light of the above teachings. It is therefore to be understood that within the scope of the appended claims, the present invention may be practiced otherwise than as specifically described.

I claim:
1. A retractable safety belt restraint system for securing a vehicle occupant in a seat, comprising:
  a pair of safety belt members having means for latching said members in operative engagement carried by the free ends thereof;
  retracting means including a body, means carried by said body mounting the other ends of said belt members for protraction and retraction, and spring means constantly biasing said belt members for retraction;
  means for preventing slack in one of said safety belt members when the other of said safety belt members is protracted; and
  spaced apart guide means on opposite sides of said retracting means engaging said belt members;
  said belt members having intermediate portions in bearing engagement with said means for preventing slack and with said spaced apart guide means whereby said belt members may be individually protracted to effect latching operative engagement.

2. The retractable safety belt restraint system of claim 1 wherein said means for preventing slack comprises track means fixedly mounted with respect to said retracting means and a dolly carried by said track for limited longitudinal movement with respect thereto, said dolly having at least two transversely mounted parallel spaced apart pins, and said belt member intermediate portions being in bearing engagement with said dolly pins and with said spaced apart guide means so that protraction of only one of said belt members effects movement of said dolly with respect to said retracting means and subsequent protraction of said other belt member effects reverse movement of said dolly.

3. The safety belt restraint system of claim 2 wherein said dolly has three transversely mounted parallel spaced apart pins, and said spaced apart guide means each comprise a rod fixedly mounted at each end of said frame, each of said belt members including a first longitudinal segment extending from said retracting means toward said dolly, passing on opposite sides of the intermediate dolly pin and between the outer dolly pins, second segments extending in opposite directions from said dolly and passing around said guide rods at the ends of said frame, and third segments extending away from said guide rods and around the occupant and seat when said safety belt members are latched in operative engagement.

4. The safety belt restraint system of claim 2 wherein said dolly has two transversely mounted parallel spaced apart pins, one of said spaced apart guide means comprising a rod fixedly mounted at one end of said frame, the other of said spaced apart guide means comprising a pair of closely longitudinally spaced apart rods fixedly mounted at the opposite end of said frame, one of said belt members including a first longitudinal segment extending from said retracting means and between said closely spaced apart guide rods, a second segment extending from said guide rods toward said dolly and passing between the dolly pins, a third segment extending from said dolly toward said closely spaced guide rods and passing around the longitudinally outermost guide rod, and a fourth segment extending away from said guide rod and around the occupant and seat when said safety belt members are latched in operative engagement, the other belt member including a first longitudinal segment extending from said retracting means toward said dolly, passing between said dolly pins, a second segment extending away from said dolly and passing around the one guide rod at the end of the frame, a third segment extending away from said guide rod and around the occupant and seat for latching engagement with said first belt member and stop means mounted on said other belt member between said second and third segments to prevent equal protraction of said belt members.

5. The safety belt restraint system of claim 2 wherein said dolly has two transversely mounted parallel spaced apart pins, said spaced apart guide means each comprising a pair of closely longitudinally spaced apart guiderods fixedly mounted at each end of the frame, each of said belt members including a first longitudinal segment extending in opposite directions from said retracting means toward said guide rods, passing between said pair of closely spaced guide rods, second segments extending toward said dolly and passing between said dolly pins, third segments extending in opposite directions from said dolly and passing around said outermost guide rods at opposite ends of said frame, and fourth segments extending away from said guide rods and around the occupant and seat when said safety belt members are latched in operative engagement.

6. The safety belt restraint system of claim 2 wherein said pair of safety belt members comprise a single integral length of belt webbing.

7. The retractable safety belt restraint system of claim 2 wherein said means carried by the retracting means body mounting the other ends of said belt members for protraction and retraction comprise a reel, and said retracting means additionally comprises stop means for preventing further protraction of said belt members from said reel, and deactivator means for said stop means rendering said stop means inactive during protraction of said seat belt members from an initial wound condition but movable in response to partial rewind rotation of said reel following said protraction to render said stop means active.

8. The retractable safety belt restraint system of claim 7 wherein said deactivator means also includes means responsive to a predetermined amount of said safety belt members being wound around said reel for rendering said stop means inactive during initial protraction of said safety belt members from an initial wound condition.

9. In a retractable safety belt restraint system for securing a vehicle occupant in a seat comprising a pair of safety belt members having complementary latching elements on the free ends thereof for connecting said members in operative engagement, and retracting means including a body, a reel rotatably supported by said body for mounting the other ends of said safety belt members for protraction and retraction from said reel and spring means constantly biasing said safety belt members for retraction, the improvement comprising:
  guide means spaced apart on opposite sides of said retracting means engaging said belt members; and
  slack preventing means including track means and a dolly carried by said track means for limited longitudinal movement with respect thereto;
  said belt members having intermediate portions in bearing engagement with said dolly and with said spaced apart guide means so that protraction of only one of said safety belt members effects movement of said dolly with respect to the retracting means and subsequent protraction of said other belt member effects reverse movement of said dolly whereby said belt members may be individually protracted to effect latching operative engagement.

References Cited

UNITED STATES PATENTS

| | | | |
|---|---|---|---|
| 2,814,504 | 11/1957 | Campbell et al. | 242—107.1X |
| 3,222,107 | 12/1965 | Ferrara | 297—388 |
| 2,937,882 | 5/1960 | Oppenheim | 297—388X |
| 3,292,744 | 12/1966 | Replogle | 297—388X |
| 3,412,952 | 11/1968 | Wohlert et al. | 242—107.4 |
| 3,488,090 | 1/1970 | Douglas | 297—389 |

STANLEY N. GILREATH, Primary Examiner

W. H. SCHROEDER, Assistant Examiner

U.S. Cl. X.R.

242—107.1, 107.4; 280—150; 297—389